United States Patent
Butt et al.

(10) Patent No.: US 10,306,556 B2
(45) Date of Patent: May 28, 2019

(54) ACCESS POINT NOTIFICATION OF WIRELESS STATIONS ABOUT AVAILABILITY OF DATA

(71) Applicant: Telefonaktiebolaget LM Ericsson (publ), Stockholm (SE)

(72) Inventors: Naveed Butt, Lund (SE); Bryan Smith, Raa (SE); Leif Wilhelmsson, Dalby (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 217 days.

(21) Appl. No.: 15/312,634

(22) PCT Filed: Feb. 2, 2016

(86) PCT No.: PCT/EP2016/052197
§ 371 (c)(1),
(2) Date: Nov. 19, 2016

(87) PCT Pub. No.: WO2017/133761
PCT Pub. Date: Aug. 10, 2017

(65) Prior Publication Data
US 2018/0227847 A1    Aug. 9, 2018

(51) Int. Cl.
*H04L 12/28* (2006.01)
*H04W 52/02* (2009.01)
(Continued)

(52) U.S. Cl.
CPC ... *H04W 52/0216* (2013.01); *H04W 28/0278* (2013.01); *H04W 52/0219* (2013.01); *H04W 92/20* (2013.01); *Y02D 70/142* (2018.01)

(58) Field of Classification Search
USPC ............... 370/252, 430, 278, 329, 311
See application file for complete search history.

(56) References Cited

U.S. PATENT DOCUMENTS

| 7,231,221 B2 | 6/2007 | Assarsson et al. |
| 2009/0010191 A1* | 1/2009 | Wentink ............ H04W 52/0216 370/311 |

(Continued)

FOREIGN PATENT DOCUMENTS

EP    2781126 B1    8/2015

OTHER PUBLICATIONS

T. Adame et al., IEEE 802.11ah: The Wi-Fi Approach for M2M Communications, arXiv:1402.4675v2 [cs.NI] Oct. 5, 2014, pp. 1-18.

(Continued)

*Primary Examiner* — John Pezzlo
(74) *Attorney, Agent, or Firm* — Leffler Intellectual Property Law, PLLC

(57) ABSTRACT

An access point device comprising a transceiver configured to receive and send messages on a communication channel, and a controller configured to cause the transceiver to transmit beacon messages regularly on the communication channel is disclosed. The beacon messages include a first indication that data, for one or more stations arranged to communicate with the access point device over the communication channel, is buffered in a buffer associated with the access point device when data is buffered in the buffer. The transceiver is arranged to transmit at least one utility message, transmitted over the communication channel between transmissions of the beacon messages, wherein the at least one utility message comprises a second indication for at least one of the one or more stations as to whether an upcoming beacon message comprises the first indication that data for the at least one of the one or more stations is buffered in the buffer. The station is arranged to communicate over the communication channel with the access point device, and arranged to apply a power save mode including (Continued)

a Doze state and an Awake state, wherein, when the station is in the Doze state, the station occasionally enters the Awake state for determining whether data for the station is buffered in the buffer and then re-enters the Doze state if no data for the station is indicated to be buffered in the buffer. The station is arranged to perform the re-entering to the Doze state at the first found one of the first indication and the second indication that indicates that no data for the station is buffered in the buffer. Methods and computer programs for the station and the access point device are also disclosed.

40 Claims, 7 Drawing Sheets

(51) Int. Cl.
*H04W 28/02* (2009.01)
*H04W 92/20* (2009.01)
*H04J 1/16* (2006.01)

(56) References Cited

U.S. PATENT DOCUMENTS

| | | |
|---|---|---|
| 2013/0223306 A1 | 8/2013 | Jin et al. |
| 2013/0250832 A1* | 9/2013 | Kim ............... H04W 52/0216 370/311 |
| 2014/0010152 A1* | 1/2014 | Park .................. H04W 28/065 370/328 |
| 2014/0192694 A1 | 7/2014 | Pantelidou |
| 2014/0321348 A1 | 10/2014 | Wentink |
| 2015/0296532 A1 | 10/2015 | Zhou et al. |
| 2016/0143085 A1* | 5/2016 | Cai .................. H04W 52/0235 370/311 |

OTHER PUBLICATIONS

PCT International Search Report, dated Sep. 29, 2016, in connection with International Application No. PCT/EP2016/052197, all pages.
PCT Written Opinion, dated Sep. 29, 2016, in connection with International Application No. PCT/EP2016/052197, all pages.

* cited by examiner

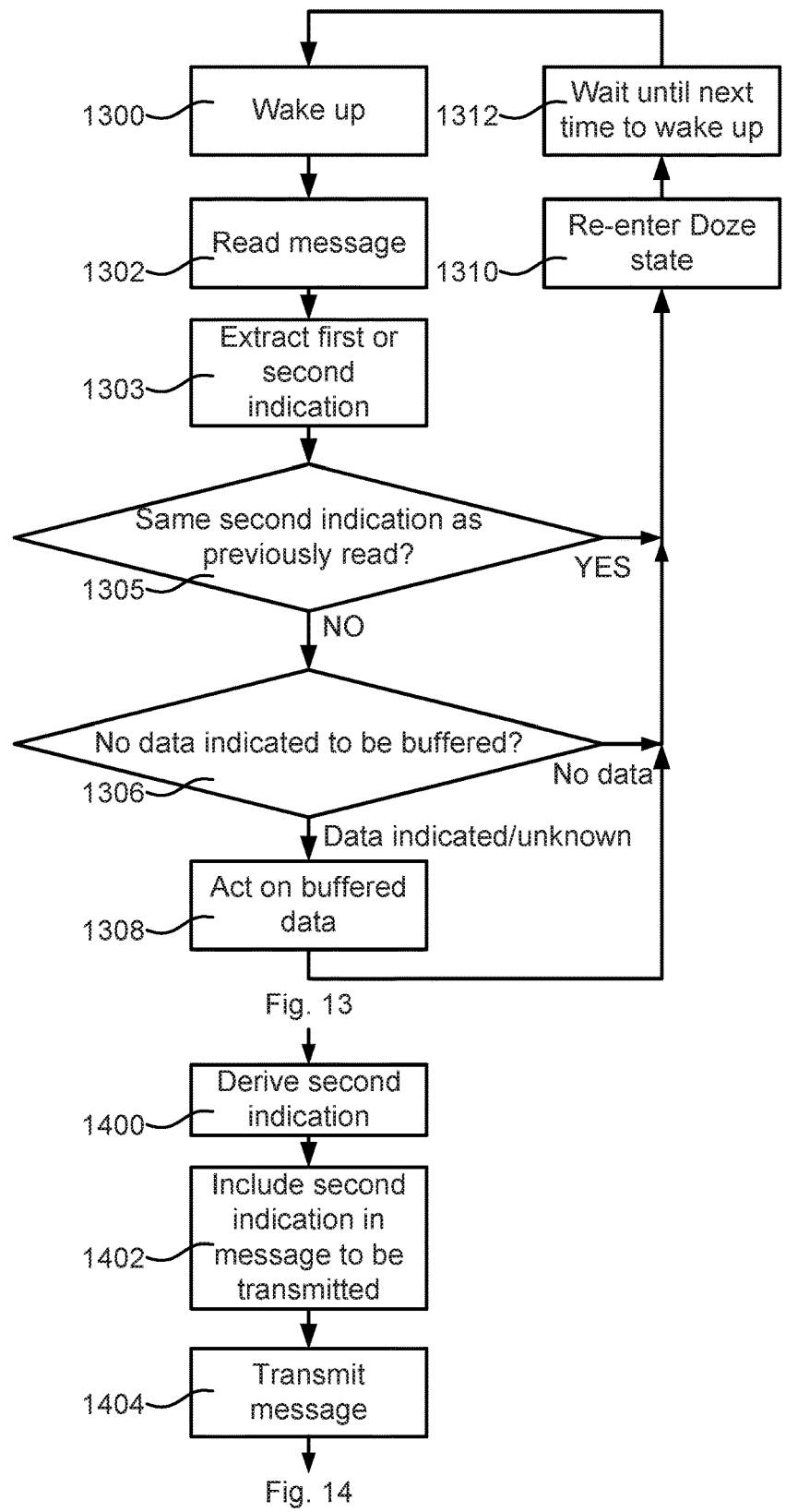

ACCESS POINT NOTIFICATION OF WIRELESS STATIONS ABOUT AVAILABILITY OF DATA

TECHNICAL FIELD

The present invention generally relates to an access point device, a station arranged to communicate with the access point device, and methods and computer programs therefor.

BACKGROUND

Due to the ever-increasing use of communication between not only people, but also things and the use of wireless local area networks, such as IEEE802.11 radios in low power devices, power management has become a critical feature. For example, the current IEEE802.11 standard allows devices to be either in an Active mode (radio always on) or a Power Save (PS) mode. A device may indicate that it switches between these states by changing a Power Management field in a Frame Control field of the Media access control Protocol Data Units (MPDUs) it sends. A device in PS mode is said to be in an Awake state when its radio is on, and in a Doze state when its radio is off. An access point device (AP) buffers traffic intended for devices in the PS mode, and informs devices of this buffered information using the Traffic Information Map (TIM) which is broadcast by the AP in every beacon frame. A device in the PS mode wakes up periodically to receive the beacons and learn from the TIM if there is any data buffered for it. The standard does not require reception of every beacon; leaving it at the discretion of the PS device, as long as it does not loose association with the AP. The TIM element indicates downlink buffered data for all stations (STAs) in the Basic Service Set (BSS). In 802.11ah, where the number of PS devices may be large, it is also possible to split the TIM into several segments and transmit each segment in a different beacon under a scheme called 'page slicing'. In this case, a PS device wakes up periodically to listen to a special beacon (transmitted by the AP at approximately predictable intervals) that carries the page slicing information.

U.S. Pat. No. 7,231,221 discloses an access scheme in a communication system which can deal with a mix of devices having different power constraints and different latency requirements and allow highly asymmetric latency behaviour. Such a communication system may include a central control station that broadcasts beacon messages on a communication channel, such as a radio channel, and at least one remote terminal that accesses a communication channel based on the beacon messages. The beacon messages are configured such that individual access to the communication channel by each terminal is controlled according to a grouping of the terminals into respective beacon groups. Each beacon group may have a corresponding beacon message, and beacon messages corresponding to different beacon groups may be broadcast at staggered time intervals. Although this is an efficient way of enabling the terminals to operate on a lean energy budget, at least the demand for remote electronic entities with very lean energy budgets to interact with a communication network calls for further advances in power saving.

SUMMARY

The invention is based on the inventors' understanding that by keeping a station operating in a power save mode in a Doze state even more will improve ability of the stations to keep a very lean energy budget.

According to a first aspect, there is provided an access point device comprising a transceiver configured to receive and send messages on a communication channel, and a controller configured to cause the transceiver to transmit beacon messages regularly on the communication channel. The beacon messages include a first indication that data, for one or more stations arranged to communicate with the access point device over the communication channel, is buffered in a buffer associated with the access point device when data is buffered in the buffer. The transceiver is arranged to transmit at least one utility message, transmitted over the communication channel between transmissions of the beacon messages, wherein the at least one utility message comprises a second indication for at least one of the one or more stations as to whether an upcoming beacon message comprises the first indication that data for the at least one of the one or more stations is buffered in the buffer.

The second indication may comprise an identity such that a repeated second indication is enabled to be discriminated from an updated second indication.

The second indication may indicate that the upcoming beacon message comprises the first indication that data for the at least one of the one or more stations is buffered in the buffer. Alternatively, the second indication may indicate that no data for any stations of the one or more stations is buffered in the buffer.

The second indication may be present in the utility message transmission as any one of a single dedicated sub-carrier, a single dedicated sub-band, a single bit, and overlaid information.

The utility message may comprise any one of a data packet and a control packet. The control packet may comprise any one of an acknowledgement frame, a block acknowledgement, a block acknowledgement request, a request-to-send, and a clear-to-send.

The first indication may be a Traffic Information Map.

According to a second aspect, there is provided a method of an access point device. The access point device comprises a controller and a transceiver configured to receive and send messages on a communication channel. The method comprises transmitting beacon messages regularly on the communication channel. The beacon messages include a first indication that data, for one or more stations arranged to communicate with the access point device over the communication channel, is buffered in a buffer associated with the access point device when data is buffered in the buffer. The method further comprises transmitting at least one utility message over the communication channel between transmissions of the beacon messages. The at least one utility message comprises a second indication for at least one of the one or more stations as to whether an upcoming beacon message comprises the first indication that data for the at least one of the one or more stations is buffered in the buffer.

The second indication may comprise an identity such that a repeated second indication is enabled to be discriminated from an updated second indication.

The second indication may indicate that the upcoming beacon message comprises the first indication that data for the at least one of the one or more stations is buffered in the buffer. Alternatively, the second indication may indicate that no data for any stations of the one or more stations is buffered in the buffer.

The second indication may be present in the utility message transmission as any one of a single dedicated sub-carrier, a single dedicated sub-band, a single bit, and overlaid information.

The utility message may comprise any one of a data packet and a control packet. The control packet may comprise any one of an acknowledgement frame, a block acknowledgement, a block acknowledgement request, a request-to-send, and a clear-to-send.

The first indication may be a Traffic Information Map.

According to a third aspect, there is provided a station arranged to communicate over a communication channel with an access point device, and arranged to apply a power save mode including a Doze state and an Awake state, wherein, when the station is in the Doze state, the station occasionally enters the Awake state for determining whether data for the station is buffered in a buffer associated with the access point device and then re-enters the Doze state if no data for the station is indicated to be buffered in the buffer. The station is arranged to make the determining from a beacon message when the beacon message is received first after entering the Awake state. The beacon message is regularly transmitted on the communication channel by the access point device. The beacon message includes a first indication that data for one or more stations arranged to communicate via the access point device over the communication channel is buffered in the buffer when data is buffered in the buffer. The station is also arranged to make the determining from a at least one utility message when the utility message is received first after entering the Awake state. The utility message is transmitted over the communication channel between transmissions of the beacon messages and comprises a second indication for at least one of the one or more stations as to whether an upcoming beacon message comprises a first indication that data for the at least one of the one or more stations is buffered in the buffer. The station is arranged to perform the re-entering to the Doze state at the first found one of the first indication and the second indication that indicates that no data for the station is buffered in the buffer.

The second indication may comprises an identity such that a repeated second indication is enabled to be discriminated from an updated second indication, wherein the station is arranged to re-enter the Doze state if it is determined that the second indication is a repeated second indication that the station already has read, and else read the second indication and determine whether to re-enter the Doze state based on the second indication.

The second indication may indicate that the upcoming beacon message comprises the first indication that data for the at least one of the one or more stations is buffered in the buffer, wherein the station is arranged to, when the second indication indicates that the upcoming beacon message comprises the first indication, stay in the Awake state and read the upcoming beacon message.

The second indication may indicate whether no data for any stations is buffered in the buffer, wherein the station is arranged to stay in the Awake state and read the upcoming beacon message when the second indication fails to indicate that no data for any stations is buffered in the buffer, and to re-enter the Doze state when the second indication indicates that no data for any stations of the one or more stations is buffered in the buffer.

The station may be arranged to, upon sending a subsequent utility message on the communication channel, include the second indication in the subsequent utility message. The second indication may be included in the subsequent utility message transmission as any one of a single dedicated sub-carrier, a single dedicated sub-band, a single bit, and overlaid information. The second indication to include in the subsequent utility message may be derived from any of a read utility message containing the second indication and a read beacon message.

The station may be enabled to enter either the power save mode or a normal mode, wherein the power save mode is entered in negotiation with the access point such that the access point buffers traffic and/or data to the station and the station is enabled to acquire the buffered traffic and/or data by polling the access point, and the normal mode includes communicating with the access point whenever traffic occurs.

The utility message including the second indication may comprise any one of a data packet and a control packet. The control packet may comprises any one of an acknowledgement frame, a block acknowledgement, a block acknowledgement request, a request-to-send, and a clear-to-send.

The first indication may be a Traffic Information Map.

According to a fourth aspect, there is provided a method of a station arranged to communicate over a communication channel with an access point device, and arranged to operate in a power save mode comprising a Doze state and an Awake state, wherein, when the station is in the Doze state, the station occasionally enters the Awake state for determining whether data for the station is buffered in a buffer associated with the access point device and then re-enter the Doze state if no data for the station is indicated to be buffered in the buffer. The method comprises reading, upon entering the Awake state, a beacon message when the beacon message is received first after entering the Awake state. The beacon message is regularly transmitted on the communication channel by the access point device. The beacon message includes a first indication that data for one or more stations arranged to communicate via the access point device over the communication channel is buffered in the buffer when data is buffered in the buffer. The method comprises reading a utility message when the utility message is received first after entering the Awake state. The utility message is transmitted over the communication channel between transmissions of the beacon messages, and comprises a second indication for at least one of the one or more stations whether an upcoming beacon message comprises the first indication that data for the at least one of the one or more stations is buffered in the buffer. The method further comprises determining, from the first found message of the beacon message and the utility message comprising the first indication or the second indication that indicates whether no data for the station is buffered in the buffer, whether there may be data buffered in the buffer for the station, and upon indication that no data is buffered for the station, re-entering the Doze state.

The second indication may comprise an identity such that a repeated second indication is enabled to be discriminated from an updated second indication, wherein the method comprises re-entering the Doze state if it is determined that the second indication is a repeated second indication that the station already has read, and else reading the second indication and determining whether to re-enter the Doze state based on the second indication.

The second indication may indicate that the upcoming beacon message comprises the first indication that data for the at least one of the one or more stations is buffered in the buffer, wherein the method comprises staying in the Awake state and reading the upcoming beacon message when the second indication indicates that the upcoming beacon message comprises the first indication.

The second indication may indicate whether no data for any stations is buffered in the buffer, wherein the method comprises staying in the Awake state and reading the upcoming beacon message when the second indication fails to indicate that no data for any stations is buffered in the buffer, and re-entering the Doze state when the second indication indicates that no data for any stations of the one or more stations is buffered in the buffer.

The method may comprise including the second indication in a subsequent utility message upon sending the subsequent utility message on the communication channel. The second indication may be included in the subsequent utility message transmission as any one of a single dedicated sub-carrier, a single dedicated sub-band, a single bit, and overlaid information. The method may comprise deriving the second indication to include in the subsequent utility message from any of a read utility message containing the second indication and a read beacon message.

The station may be enabled to enter either the power save mode or a normal mode, wherein the power save mode is entered in negotiation with the access point such that the access point buffers traffic and/or data to the station and the station is enables to acquire the buffered traffic and/or data by polling the access point, and the normal mode includes communicating with the access point whenever traffic occurs.

The utility message including the second indication may comprise any one of a data packet and a control packet. The control packet may comprise any one of an acknowledgement frame, a block acknowledgement, a block acknowledgement request, a request-to-send, and a clear-to-send.

The first indication may be a Traffic Information Map.

According to a fifth aspect, there is provided a computer program comprising instructions which, when executed on a processor of an access point device, causes the access point device to perform the method according to the second aspect.

According to a sixth aspect, there is provided a computer program comprising instructions which, when executed on a processor of a station, causes the station to perform the method according to the fourth aspect.

According to a seventh aspect, there is provided a non-transitory computer-readable medium comprising a computer program comprising instructions which, when executed on a processor of an access point device, causes the access point device to perform the method according to the second aspect.

According to an eighth aspect, there is provided a non-transitory computer-readable medium comprising a computer program comprising instructions which, when executed on a processor of station, causes the station to perform the method according to the fourth aspect.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings.

FIG. 13 is a flow chart illustrating a method of a station according to an embodiment.

FIG. 14 is a flow chart illustrating certain actions of a method of a station according to an embodiment.

DETAILED DESCRIPTION

Figure 1:
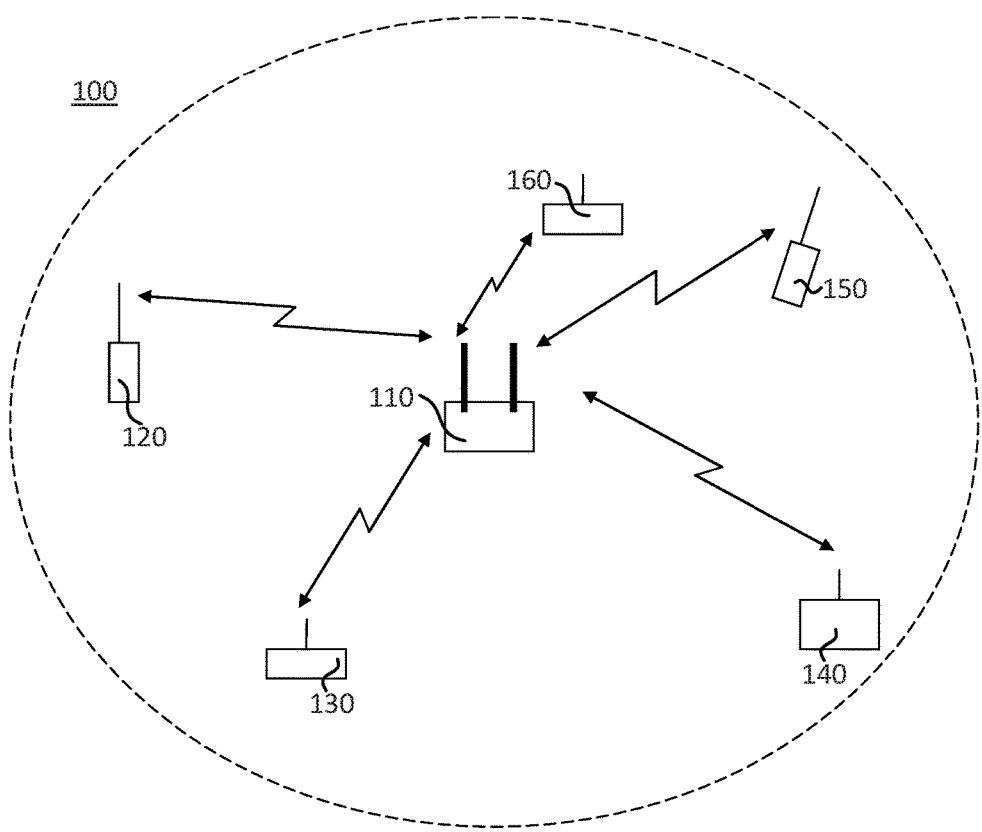
FIG. 1 depicts a conventional wireless communication system having an access point device, and remote terminals, i.e. stations.

For the understanding of the contribution of this disclosure, we turn to FIGS. 1 to 4 for an initial discussion. Reference can also be made to U.S. Pat. No. 7,231,221, which discloses provision of beacon messages including information for indicating that buffered data in an access point device is waiting for a station. FIG. 1 illustrates a conventional wireless communication system 100 arranged as a star network. An access point device 110, provides one or more communication channels on which remote stations 120, 130, 140, 150, 160, and the access point device 110 can communicate. In this disclosure, the terms "station" and "access point device" are used since they are the commonly used terms within the field of wireless networks. However, the term "station" may be substituted by terms such as "terminal", "wireless device", "wireless client", etc. used for some types of wireless communication systems. Similarly, the term "access point device" may be substituted by terms such as "base station", "master station", "network node", etc., and thus the terms "station" and "access point device" should be understood also in their broad functional meaning. Similar, the terms "Awake state" and "Doze state" have been used, but these terms, respectively, may be substituted by "live state", "alert state", "attentive state", "aware state", "active state", etc. and "sleep state", "rest state", "nap state", "siesta state", "slumber state", "inactive state", etc. The intelligence needed to operate the system 100 can be concentrated in the access point device 110, so the remote stations can be simpler, low complexity devices. On the other hand, the stations and access point device may all be similar, as in many wireless local area networks, but configured for different roles. While no traffic is offered to the channel, the stations may operate in low-power mode in order to decrease energy consumption, e.g. to extend the battery life.

A station may be enabled to either operate in the low-power mode, also referred to as power save mode, or a normal mode. The power save mode may be entered in negotiation with the access point device 110 such that the access point device 110 buffers traffic and/or data to the station and the station is enabled to acquire the buffered traffic and/or data by polling the access point device 110. The normal mode includes communicating with the access point device 110 whenever traffic occurs. In some parts of this disclosure, the entering of the Awake state from the Doze state is referred to "awakes" etc. or "wakes up", and the entering of the Doze state from the Awake state is referred to as "Dozes" or "goes to sleep" etc. for the sake of brevity. Some stations may be dedicated to operate in power save mode only.

Here, the access point device buffers the traffic and/or data in a buffer associated with the access point device, which hereafter is referred to as "buffered in the access point device" for the sake of brevity. Normally, the buffer is a memory physically located in the access point device, but other architectures are equally feasible, e.g. storage is handled by a server associated with the access point device, i.e. what is popularly referred to as a "cloud solution".

Figure 2:
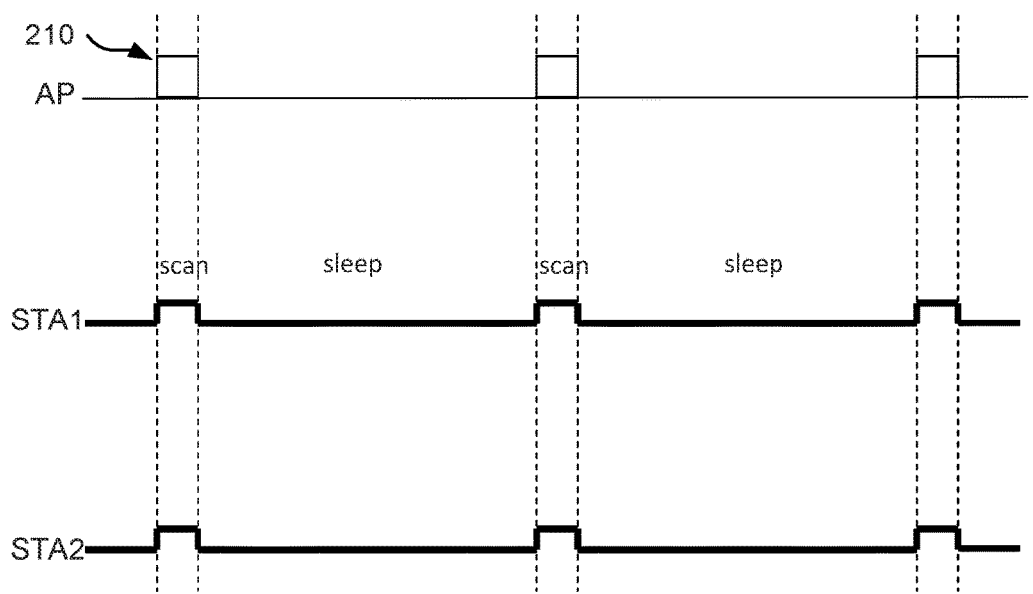
FIG. 2 is a timing diagram of a conventional beacon signal provided by an access point device and activity periods of two remote stations.

A station operation in low-power mode may be facilitated by a beacon signal broadcast by the access point device 110, i.e. a transmitter of the access point device 110 transmits a beacon message. The stations remain time-synchronized to the beacon. When the beacon is about to be transmitted, the stations wake up, receive the beacon signal, process it appropriately, viz., the stations "read" the beacon. Depending on information read from the beacon, further actions may be taken by the stations. FIG. 2 is a timing diagram of a conventional beacon signal provided by the access point device and activity periods of two remote stations. A beacon signal 210 is broadcast by the access point device 110 at a regular interval, and the stations, represented by STA1 and STA2 in FIG. 2, wake up during the beacon transmission and read, or scan it, and Doze otherwise. The power save mode thus includes an Awake state and a Doze state. In the case depicted in FIG. 2, data links to the stations are not established, so they operate in idle or standby.

Figure 3:
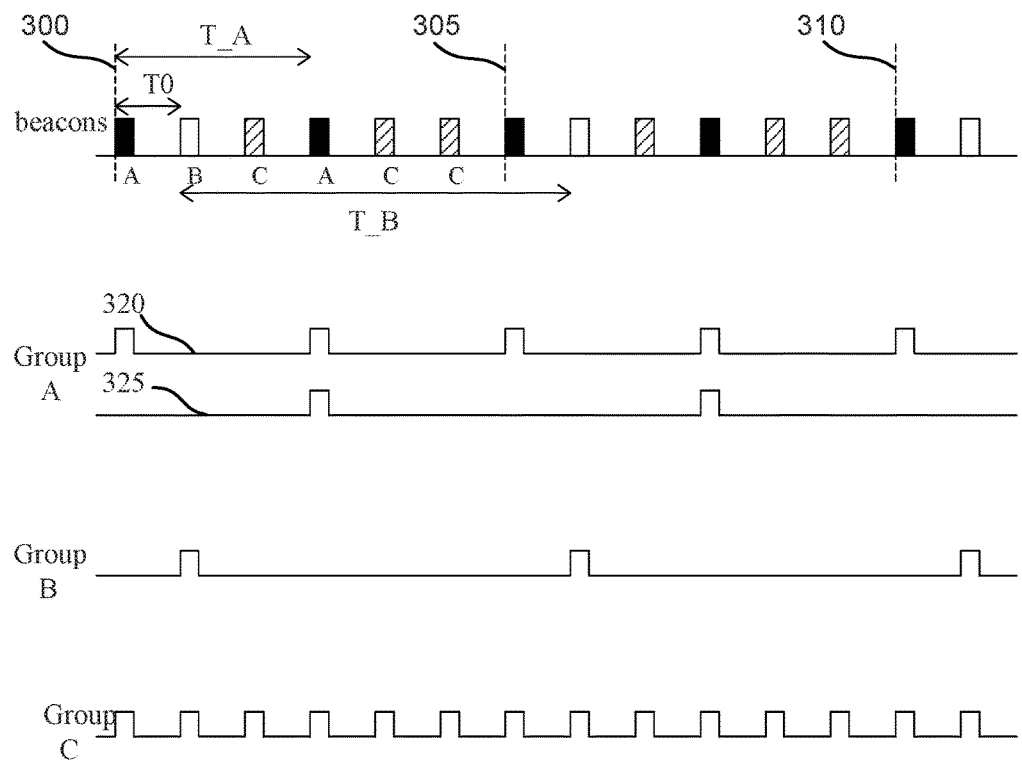
FIG. 3 is a timing diagram showing exemplary beacon groups according to conventional technique.

Such beacon signals are used in several wireless communication systems, and among them such communication systems used for providing a wireless local area network. Stations may have different demands, such as latency requirements or stand-by time, which can be supported by organizing the stations into a plurality of beacon groups. Stations having similar demands may be collected in the same beacon group, and each beacon group is served by its own beacon, which does not necessarily occur at fixed intervals. All beacons may be transmitted on the same communication channel but at different times, which has the effect of interleaving the different beacons by time division multiplexing. Nevertheless, it will be appreciated that more than one channel may be used for beacons; such channels can then be considered separately as described here. FIG. 3 is a timing diagram of a communication system having three beacon groups identified as Groups A, B, and C. It can be seen that the sequence of beacon messages looks like a grid or picket fence. Let the interval between beacon messages, or the beacon window or grid timing, be T0 seconds (s). In FIG. 3, beacon messages intended for stations in Group A are shown as having a fixed beacon interval T_A=3×T0 s, beacon messages intended for Group B stations are shown as having a beacon interval that is twice that of Group A, or T_B=6×T0 s; and beacon messages intended for Group C stations are shown as having an irregular beacon interval. Stated another way, in each beacon cycle, or interval, of 6×T0 s, two of which are indicated by the lines 300, 305, 310, Group A owns two potential beacon transmissions, Group B owns one potential beacon transmission, and Group C owns six potential beacon transmissions. The potential messages intended for each Group are also illustrated separately in FIG. 3.

In FIG. 3, the irregularity of beacon transmission for Group C rather than of Group C itself may be noted. In principle, a unit can wake up (regularly or irregularly) to any beacon, e.g., just to remain synchronized, but it is only on the beacons corresponding to the unit's Group where transactions can take place. The uppermost trace in FIG. 3 shows an irregular sequence of Group C beacons. If Group C stations carry out irregular scans, then Group C stations may wake up only at the Group C beacons. It will be noted that in that case, all beacons and all Groups are completely separated. Considering the lowest trace in FIG. 3, it may seem odd that Group C stations can also wake up at the beacons for Groups A and B. This can be advantageous for several reasons, e.g., beacon replacement, which is described in more detail below, and maintaining synchronization. If a Group C station has a clock that drifts with respect to the access point device's clock, the station might slip out of sync if the time interval between resynchronizations is too long.

The average uplink latency for the stations in Group A is less than (i.e., half of) the uplink latency for the stations in Group B. Group C is able to support more stations than Groups A or B before blocking problems occur as more access possibilities are present per cycle of 6×T0 s (i.e., 6 vs. 2 or 1). In an alternative embodiment, the controller may replace a beacon of one group by a beacon of another group if urgent operations have to be initiated by the controller. In FIG. 3 for example, stations in Group C may need a downlink latency of T0 s, so the Group C stations, which wake up at every beacon instant, are awake to receive the beacons belonging to Groups A and B as well as their own. In the event the controller needs to reach a Group C station very quickly, it can do so simply by replacing a Group A or B beacon with a Group C beacon.

FIG. 3 also illustrates a situation in which the latency in the downlink is also different. For example, Group A may include two stations having different downlink requirements, in which case one station need not wake up for every beacon transmission intended for Group A. In FIG. 3, one Group A station wakes up at every beacon transmission belonging to its group as indicated by the trace 320, and thus the uplink and downlink latencies are identical for this station. In contrast, another Group A station wakes up only every two beacon transmissions intended for its group as indicated by the trace 325. When the station has data to send in the uplink, it may perform an uplink transmission in a traditional way, e.g. instantly checking if the communication channel is free and then perform the transmission. Considering that a lean energy budged is desired to be held it may combine the uplink transmission, where the station is awake anyway, to check for buffered downlink traffic, where it can choose to wake up at any beacon of Group A, and thus its uplink latency is that of the beacon interval of Group A, but since the station wakes up to receive data in the downlink only every two beacons, its downlink latency is double that of its uplink latency and is double that of the station. Stated another way, the uplink latency of station is half its downlink latency. It will also be noted that although the station has the same duty cycle as the stations in Group B, the stations in Group B have an uplink latency that is twice that of the station. Of course, different relationships can be chosen that accommodate different latency differences between stations in a group or between uplink and downlink latencies in a station.

Figure 4:
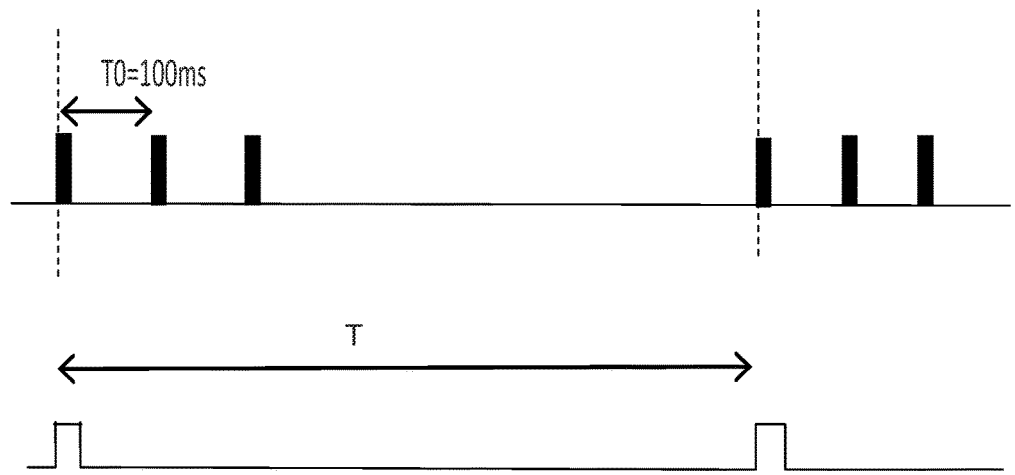
FIG. 4 is a timing diagram which depicts beacon message transmissions according to conventional technique.

FIG. 4 is a timing diagram which depicts beacon message transmissions according to conventional technique, where a station is in Doze state most of the time (i.e., the station is waiting for incoming or outgoing data). For outgoing data, the latency requirements may be stringent: after for example a measurement by a sensor connected to the station, the data associated therewith may be expected to be provided within, say, 100 ms, so the uplink latency may be on the order of 100 ms. For incoming data, e.g. update of settings or applications, operations may not be that time critical, and the delay between the arrival of the data and the signalling in the station may be up to several seconds, hours or even days. Therefore, the downlink latency is, say, T. A useful beacon structure for this example application is shown in FIG. 4 and includes beacon transmissions scheduled every T0=100 ms, but the station need not wake up every 100 ms. In order to save power, the station wakes up every T (seconds, hours, days, . . . ). The network may activate the station every T, so the latency in the downlink is T. Yet, when an event for uplink traffic occurs in the station, the station can be activated at any time.

As stated above, the stations may, when in the power save mode as also discussed above, turn on their radio only to listen to periodic traffic information broadcasts from the access point device, or when they have data to transmit. Upon awakening, the station listens to the broadcast beacon to see if a particular bit related to itself is active in a Traffic Information Map (TIM). Listening for the beacon may still take 100 ms when waking up after a long time and if there is no data, the power is wasted. For instance, if the station is in deep sleep, e.g. a state where power for circuits of the station is put very low, for a long time this means its clock will drift, and the listening time may be significant compared to the duration of the beacon, resulting in significant power consumption. The limitation may also apply to 'page slicing' scheme in the communication system, as for example in IEEE 802.11ah, where stations may still need to listen to periodic beacons to learn about the slicing information.

The stations operated in power save mode may be grouped and the TIM may comprise a few bits indicating whether there is data to a station in that group. A station then only considers the TIM of the beacon message if it belongs to the corresponding group. Approaches for handling groups are for example presented in US2013/0223306 and EP2781126. The grouping and handling of the groups may provide for improved operation.

Thus, the beacon will provide a first indication, e.g. the TIM, where the station will know whether there is buffered data at the access point, and the proposed indicator will then be a second indication, e.g. a flag, a bit pattern or number, which tells the station whether there may be buffered data which will be given by the first indication in an upcoming beacon message. The second indication enables a station operating in the power save mode to go back to the Doze state immediately after reading the second indication when not needed to be awake. Given that the stations discussed herein generally have very few data transfers, this approach provides longer times in Doze state to all stations operating in power save mode, resulting in more energy savings compared with the solution where a power save enabled (PS) device has to wake up at predicted intervals, wait for the traffic information broadcast from the access point, and decode the TIM in the broadcasted beacon message to see if there is data available for it.

Thus, by sending dedicated buffered traffic and/or data information also in data packets other than the beacon messages, hereafter such transmissions are called 'utility messages' which include all transmissions not being beacon messages, potentially both applicable for uplink and downlink communications, the need for stations to always stay awake and listen for the beacon is removed, so that they can go back to Doze state immediately when no data for them are buffered at the access point device.

According to one embodiment, a flag indicating 'No Buffered Traffic for Any Station in Power Save Mode' is introduced as the second indication in the transmissions of utility messages from the access point device, which may also be copied and retransmitted during uplink transmissions. This may be done over a single dedicated sub-carrier, sub-band, as a single bit in every packet transmission, or as overlaid information (in, e.g., some control field intended only for particular low power stations). When the flag is active, indicating that there is traffic and/or data for at least one station in the power save mode, the station stays awake until the next beacon message or wakes up for the next beacon message to determine whether the buffered data was for itself or for some other station. If the number of stations operating in power save mode is large, then most of the time the data will be for another station. To further improve the performance in this case, the stations operated in power save mode may be grouped and the single flag may be replaced by a few bits indicating whether there is data to any station in that group. A station then only waits for the beacon if the corresponding group is indicted to have buffered data for one of its stations. An additional feature can be including some "version" information for when the current flag was activated or last refreshed because of new data becoming available. This may be made by providing an identity of an indicator, wherein a station is able to determine if that particular indicator has been read before and been acted upon, wherein the station in such cases can re-enter the Doze state immediately in such cases. That identity of the indicator may for example be a time indicator, e.g. a time stamp or age, or a sequence number or any other suitable number or symbol able to discriminate from previously used identities. Identities may be re-used after some time when it is likely that all power save mode stations have been reading another identity in the meantime. This provides for enabling a limited data set, e.g. a couple of bits or bytes, for the identity. The indicator may further comprise information on whether the second indication was updated since last beacon. This information will act as a heads-up that the upcoming beacon will contain new information.

An advantage is that new data may be identified at any wake-up instant by comparing a read identity with a previously read identity, and when the read identity is equal to the previous read identity there is no new data, and Doze state can be entered instantly, and when not equal there is new data and the station acts on this.

Figure 5:
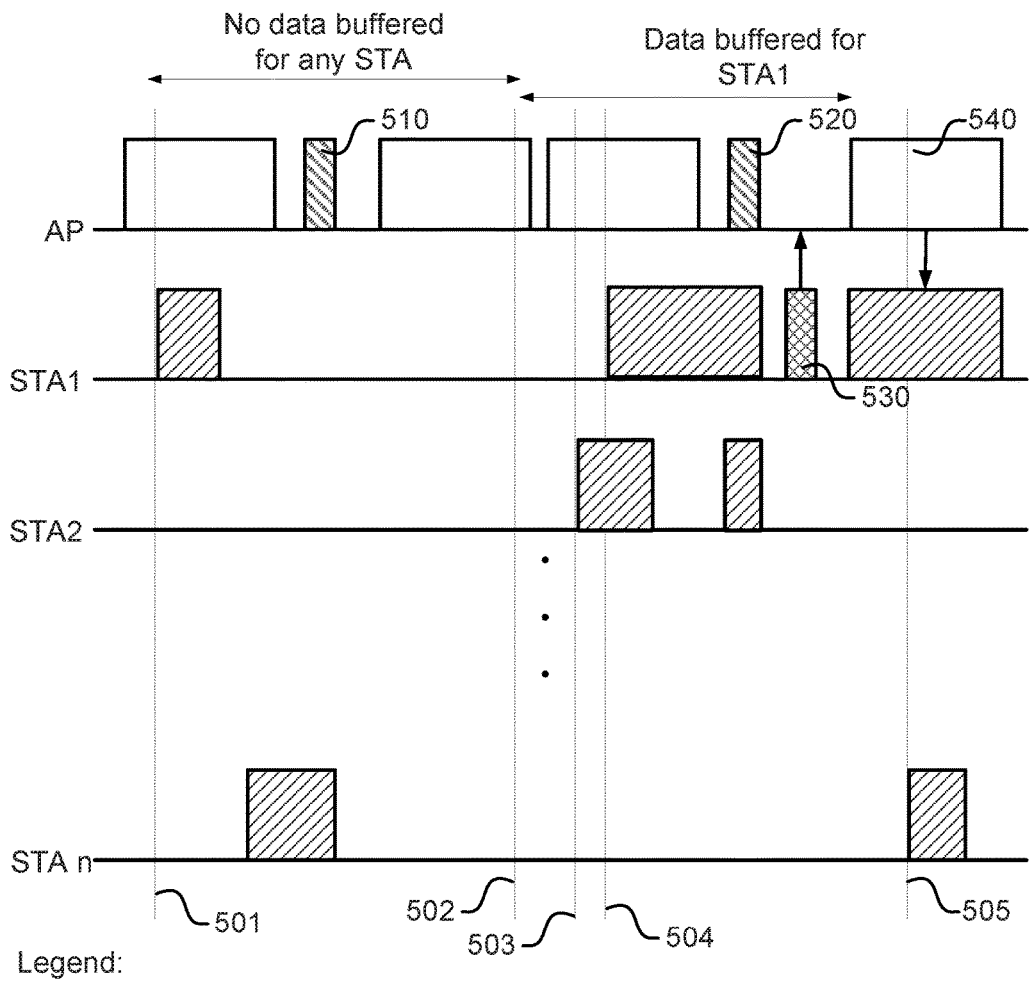
FIG. 5 is a signal scheme illustrating an example employing an embodiment.

FIG. 5 is a signal scheme illustrating an example employing an embodiment. On top, there is a time line representing transmissions on a communication channel from an access point device AP, and below that there are time lines for stations STA1-STAn associated with the access point device AP. A few time instances 501-505 are marked and will be referred to in the discussion below.

Between time 501 and time 502 it is assumed that the access point device AP does not have any data related to traffic for any of the associated stations STA1-STAn, while after time 502 there is data related to traffic for station STA1. Furthermore, the stations STA1-STAn are assumed to be stations operating in power save mode, and the access point device AP is further assumed to also communicate with other stations operating in normal mode. These other stations are not given any diagrams so as not to obscure the intended topic of this explanation.

At time 501, the access point device AP is transmitting a utility message, e.g. to some of the stations operating in the normal mode, and the first power save mode station STA1 is starting its receiver and starts to listen to the communication channel. The first station STA1 does not have to listen until the access point device AP transmits a beacon message 510 since the access point device included the second identification in the transmission to the other station, and the first station was able to determine that there was no traffic and/or data buffered for the stations STA1-STAn, which may be all power save mode stations or all power save mode stations of a group. Another example is given for the n'th station STAn which starts to listen a little later than the first station STA1. Here, the n'th station STAn does not manage to get any second identification from the utility message as the first station STA1 did, and the n'th station continues to listen until it gets the first identification from the beacon 510 and then gets back to Doze state.

At time 502, the access point device AP gets a message for the first station STA1 and buffers the message. The access point device AP then includes a second identification in utility messages and also prepares a first identification to be transmitted in an upcoming beacon message 520. The second station STA2 wakes up at time 503 and listens on the communication channel. From the second identification the second station STA2 gets that there is data buffered for at least one of the power save mode stations STA1-STAn. The second station may then enter Doze state again to wake up to listen for the upcoming beacon message 520. Note here that this approach is one alternative and another alternative will be demonstrated for the first station where the station does not enter the Doze state and instead stays awake until the beacon message 520 is read. Any of the power save mode stations may use any of these alternatives.

At time 504, the first station STA1 wakes up and listens on the communication channel. From the utility message sent by the access point device AP the first station gets the second identification which tells that there is buffered traffic and/or data for at least one of the power save mode stations STA1-STAn. The first station STA1 stays awake and reads the upcoming beacon message 520 and finds out that there is traffic and/or data buffered for it. The first station then transmits a poll message 530 to the access point device AP which transmits a utility message 540 to the first station STA1. The first station STA1 receives the utility message.

At time 505 the n'th station STAn wakes up and listens on the communication channel. In the utility message sent from the access point device AP to the first station STA1 there is now included a second identification that tells the n'th station that there is no buffered traffic and/or data (since it is now being sent to the first station STA1), and the n'th station STAn returns to the Doze state.

The second indication can be provided in any suitable way. For example, the access point device may include the second indication in a control field of the utility message, e.g. as a dedicated field or bit. Other examples are that the access point device provides the second indication in a single dedicated sub-carrier or sub-band, as overlaid information, etc. Furthermore, stations may copy the second indication into any utility message transmissions made over the communication channel. Thereby, the second indication will be frequently available on any transmissions over the communication channel.

Figure 6:
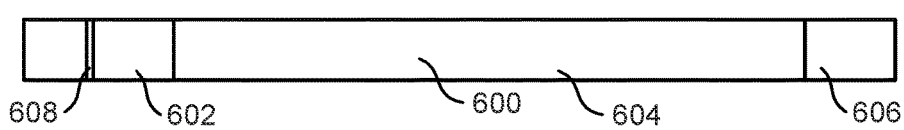
FIG. 6 illustrates an example of an indicator in a utility message.

FIG. 6 illustrates an example of a second indication in a utility message 600. In this example, the utility message comprises a header 602, e.g. a medium access (MAC) header, and a work load part 604. There may also be a tail part 606 comprising for example a checksum, such as cyclic redundancy check (CRC). The second indication demonstrated above may for example be included in the header 602 as a field 608 for power saving information. The field 608 may include a single flag bit, or may comprise a few bits such that some additional information, e.g. identity/version information of the second indication, which enables a station reading the second indication to determine whether the second indication has been updated since last reading and/or whether the second indication relates to the station's own group.

Figure 7:
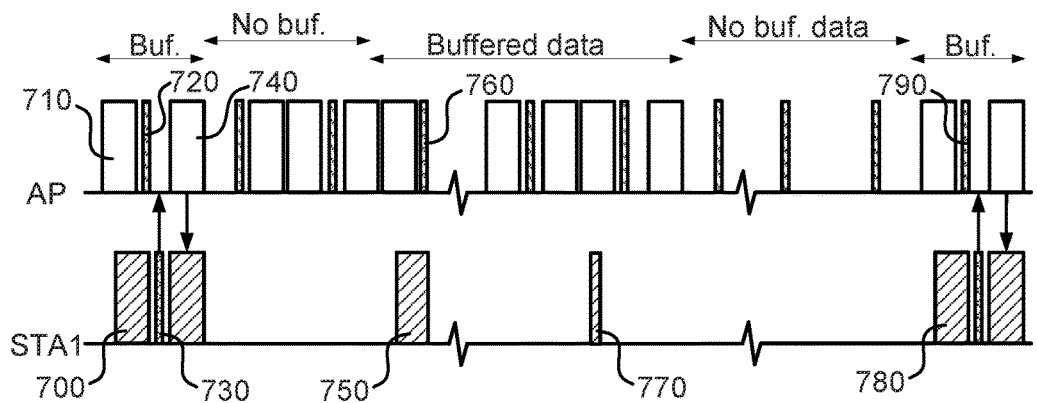
FIG. 7 is a signal scheme illustrating an example employing an embodiment.

FIG. 7 is a signal scheme illustrating an example employing an embodiment. Here, the energy saving is taken one step further by the access point device providing the second indication with an identity such that the stations are enabled to figure out whether the indicator is updated or whether it has been read previously, wherein the station may re-enter Doze state also when the indicator indicates that some station has buffered data at the access point device. This relies on the knowledge in the station that this particular indicator with this identity concerns other stations, wherein the knowledge has been acquired at a previous reading of the second indication with this identity, and where the further reading of the first indication associated therewith shows that the buffered traffic and/or data was for other power save mode stations. The legend shown in FIG. 5 also applies for FIG. 7.

A station STA1 wakes up and listens 700 on the communication channel. An access point device AP transmits a utility message 710 to some station associated with the access point device AP. In the utility message a second identification is included, as demonstrated above, wherein the station STA1 is able to see that traffic and/or data is buffered in the access point device AP, and the station STA1 remains awake and reads a beacon message 720 transmitted by the access point device AP. From the beacon message 720 the station STA1 sees that the buffered traffic and/or data is intended for it and sends a poll message 730 to the access point device AP, which in turn provides a utility message 740 with the buffered traffic and/or data to the station STA1. The station STA1 goes to Doze state after the reception and the access point device continues transmitting beacon messages regularly and transmits utility messages between the beacon message transmissions. After a while, the station wakes up and listens 750 on the communication channel again, wherein it finds out that there is buffered data from the second indication, and reads the upcoming beacon message 760. From that, the station STA1 finds out from the first indication that the buffered traffic and/or data is for another station and the station STA1 returns to Doze state. When reading the second indication, the station STA1 reads and stores a version or identity of the second indication. After some time the station STA1 wakes up and listens 770 on the communication channel. From a second indication the station STA1 finds out that there is buffered traffic and/or data, but by comparing the version or identity of the read second indication with the stored version or indication the station STA1 sees that it is the same as already read before. Therefore, the station STA1 will know that the buffered traffic and/or data is still for another station, and can therefore immediately return to Doze state. Power is thus saved by the station STA1 does not need to read an upcoming beacon message before returning to Doze state. Next time the station STA1 wakes up and listens 780 on the communication channel the station STA1 finds out that there is buffered traffic and/or data, and by comparing the version or identity of the read second indication with the stored version or indication the station STA1 sees that it is a new version or identity. Therefore, the station STA1 will now read the upcoming beacon message 790 and for example find out that there is buffered traffic and/or data for the station STA1 and get the buffered traffic and/or data similar as demonstrated earlier.

Figure 8:
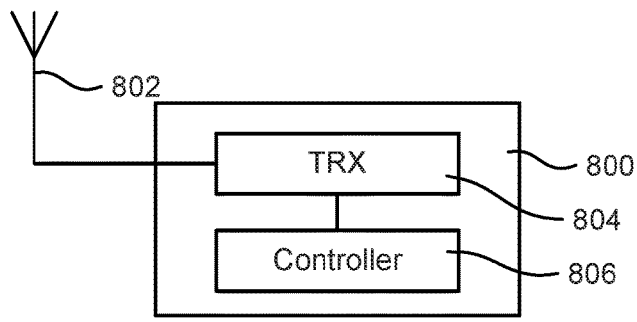
FIG. 8 is a block diagram schematically illustrating an access point device according to an embodiment.

FIG. 8 is a block diagram schematically illustrating an access point device 800 according to an embodiment. The access point device comprises an antenna arrangement 802, a transceiver 804 connected to the antenna arrangement 802, and a processing element 806 which may comprise one or more circuits and is arranged to operate as a controller of the access point device 800. The access point device may comprise one or more input interfaces and/or one or more output interfaces arranged for enabling the access point device 800 to complete for example providing backhaul towards one or more communication networks, e.g. by signal interfaces, e.g. wireless, electrical or optical. The interfaces can also include user interfaces for enabling user interaction, for example for maintenance or configuration. The access point device 800 is arranged to operate in a communication network for enabling communication with one or more stations, as illustrated in FIG. 1. In particular, by the processing element 806 being arranged to perform any of the embodiments demonstrated with reference to FIG. 9, the access point device 800 is capable of enabling at least some of the interacting stations to operate with limited energy consumption. The processing element 806 can also fulfill a multitude of tasks, ranging from signal processing to enable reception and transmission since it is connected to the transceiver 804, executing applications, controlling the interfaces, etc. In particular, the access point device 800 is enabled to operate with stations which operate in the power save mode. That is, the access point device 800 needs to know which stations that operate in the power save mode, buffer incoming traffic and/or data for these stations, and be able to provide the information to a station when being polled. As demonstrated above, for enabling the further saving of power for the stations, the access point device 800 is further arranged to provide not only the first indication in the beacon messages, but also the second indication in utility messages transmitted between the beacon messages. The processing element 806 and the transceiver 804 will provide for this.

Figure 9:
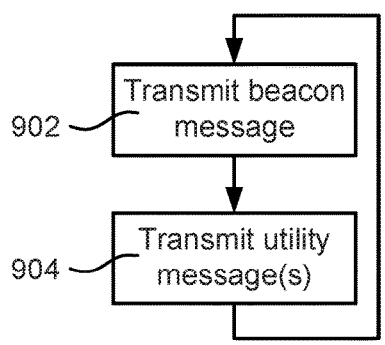
FIG. 9 is a flow chart illustrating a method of an access point device according to an embodiment.

FIG. 9 is a flow chart illustrating a method of an access point device according to an embodiment. The access point device comprises, as discussed above, a transceiver configured to receive and send messages on a communication channel and a controller.

The transceiver transmits 902 beacon messages regularly on the communication channel. The beacon messages includes a first indication that traffic and/or data for power save mode stations is buffered in the access point device. The transceiver transmits 904 utility messages over the communication channel between transmissions of the beacon messages whenever there is a need for utility transmission. The utility messages comprise a second indication for power save mode stations whether an upcoming beacon message comprises the first indication indicating that data for the at least one of the one or more stations is buffered in the access point device. Thus, if the first indication in the upcoming beacon message is lacking or if scheduled to indicate that no data is buffered, depending on the applied signalling, the second indication may indicate this, which will be interpreted by the station as an indication to return to the Doze state. Thus, the access point device will enable stations in the power save mode to save further power, as has been discussed above. This may for example be accomplished by that the second indication indicates whether the upcoming beacon message comprises the first indication that data for one or some of the stations is buffered in the access point device, i.e. a "traffic and/or data indicator", or that the second indicator indicates whether no data for any stations is buffered in the access point device, i.e. a "no traffic and/or data indicator". As also has been discussed above, the second indication may also comprise a version indicator or identity such that the power save mode stations may still further save power. The inclusion of the second indication in the utility messages may be accomplished in different ways, e.g. as on a dedicated sub-carrier, on a dedicated sub-band, in a bit or field of bits, as overlaid information, etc.

Figure 10:
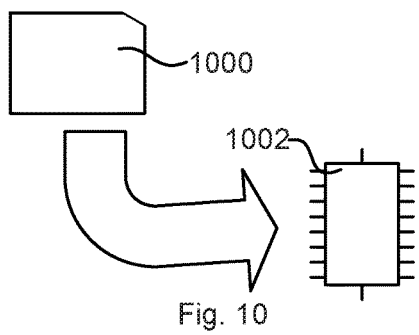
FIG. 10 schematically illustrates a computer-readable medium and a processing device of an access point device.

FIG. 10 schematically illustrates a computer-readable medium 1000, which may be non-transitory, and a processing device 1002 of an access point device. The methods as demonstrated with reference to FIG. 9 are suitable for implementation with aid of processing means, such as computers and/or processors, especially for the case where the processing element 806 demonstrated above comprises a processor handling operation for power saving mode of stations interacting with the access point device. Therefore, there is provided computer programs, comprising instructions arranged to cause the processing means, processor, or computer to perform the steps of any of the methods according to any of the embodiments described with reference to FIG. 9. The computer programs preferably comprises program code which is stored on the computer-readable medium 1000, as illustrated in FIG. 10, which can be loaded and executed by the processing means, processor, or computer 1002 to cause it to perform the methods, respectively, according to embodiments demonstrated above, preferably as any of the embodiments described with reference to FIG. 9. The processing device 1002 and computer program product 1000 can be arranged to execute the program code sequentially where actions of the any of the methods are performed stepwise, but may as well perform actions on a real-time basis. The processing means, processor, or computer 1002 is preferably what normally is referred to as an embedded system. Thus, the depicted computer-readable medium 1000 and processing device 1002 in FIG. 10 should be construed to be for illustrative purposes only to provide understanding of the principle, and not to be construed as any direct illustration of the elements.

Figure 11:
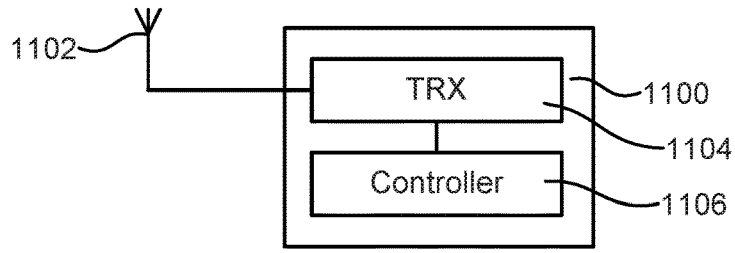
FIG. 11 is a block diagram schematically illustrating station according to an embodiment.

FIG. 11 is a block diagram schematically illustrating a station 1100 according to an embodiment. The station comprises an antenna arrangement 1102, a transceiver 1104 connected to the antenna arrangement 1102, and a processing element 1106 which may comprise one or more circuits and is arranged to operate as a controller of the station 1100. The station may comprise one or more input interfaces and/or one or more output interfaces arranged for enabling the station 1100 to complete whatever task it may have, e.g. controlling an entity, collecting measurements, and/or providing user interaction. The interfaces can be user interfaces and/or signal interfaces, e.g. electrical or optical. The station 1100 is arranged to operate in a communication network via an access point device. In particular, by the processing element 1106 being arranged to perform any of the embodiments demonstrated with reference to FIG. 12 or 13, with possible features as demonstrated with reference to any of FIG. 14 or 15, the station 1100 is capable of operating with limited energy consumption. The processing element 1106 can also fulfill a multitude of tasks, ranging from signal processing to enable reception and transmission since it is connected to the transceiver 1104, executing applications, controlling the interfaces, etc.

Figure 12:
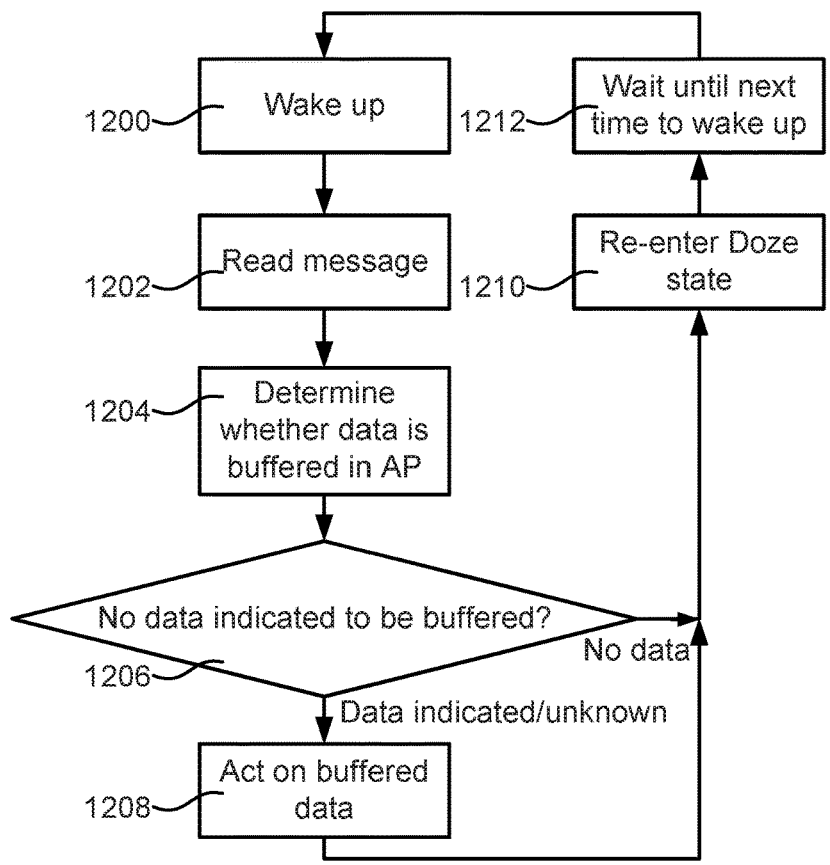
FIG. 12 is a flow chart illustrating a method of a station according to an embodiment.

FIG. 12 is a flow chart illustrating a method of a station according to an embodiment. The station is arranged to communicate over a communication channel with an access point device, and arranged to operate in a power save mode comprising a Doze state and an Awake state. The station can for example be enabled to enter either the power save mode or a normal mode. The power save mode is preferably entered in negotiation with the access point such that the access point buffers traffic and/or data to the station and the station is enabled to acquire the buffered traffic and/or data by polling the access point. The normal mode includes communicating with the access point whenever traffic occurs. Operation in the normal mode is not discussed further here not to obscure the particular inclination of making the power save mode even more power saving. The station may also be dedicated to always operate in the power save mode. For example, as station operating together with a remote sensor where the arrangement at the station have strict power consumptions constraints, e.g. enabling battery operation with charging/battery change with very long service intervals, such as months/years, may be dedicated to only operate in the power save mode.

When the station is in the Doze state, the station occasionally enters 1200 the Awake state for determining 1204 whether data for the station is buffered in the access point device and then re-enter 1210 the Doze state if no data for the station is indicated to be buffered 1206 in the access point device. The station reads 1202 upon entering the Awake state, any of a beacon message regularly transmitted on the communication channel by the access point device or a second indication included in a utility message. The beacon message includes a first indication that data for one or more stations arranged to communicate via the access point device over the communication channel is buffered in the access point device when data is buffered in the access point. The first indication may for example comprise a Traffic Information Map. A utility message, which is transmitted over the communication channel between transmissions of the beacon messages, comprises the second indication for at least one of the one or more stations whether an upcoming beacon message comprises the first indication that data for power save mode stations is buffered in the access point device. The determining 1204 is made from the first found message comprising the first indication or the second indication that indicates whether no data for the station is buffered in the access point device or whether there may be data buffered in the access point device for the station. Upon indication 1206 that no data is buffered for the station, the station re-enters 1210 the Doze state and waits 1212 for next time to wake up 1200. When it cannot be ascertained 1206 that no data is buffered, the station acts 1208 on the information according to any of the above demonstrated ways.

The second indication may comprise an identity such that a repeated second indication is enabled to be discriminated from an updated second indication. Thus, when re-entering 1210 the Doze state, a version indicator or identity of the just read second indication is stored. Next time a second indication is read and if it is determined that the second indication is a repeated second indication that the station already has read, the station can go to Doze state immediately. If the second indication is a new one, the station reads the second indication and determines 1204 whether to re-enter 1210 the Doze state based on the second indication. This provides for faster return to Doze state when possible, and thus a further power saving. This will be further discussed with reference to FIG. 13.

The second indication indicates whether the upcoming beacon message comprises the first indication that data for the at least one of the one or more stations is buffered in the access point device. The station can thus decide 1206 whether stay in the Awake state and reading the upcoming beacon message when the second indication indicates that the upcoming beacon message comprises the first indication. Alternatively, the second indication explicitly indicates that no data for any stations is buffered in the access point device, i.e. when no data is buffered, wherein the station stays in the Awake state and reads the upcoming beacon message when the second indication fails to indicate that no data for any stations is buffered in the access point device, and re-enters 1210 the Doze state when the second indication indicates that no data for any stations is buffered in the access point device.

The second indication may also be included in a utility message sent from the station. This will be further discussed with reference to FIG. 14.

The second indication can for example be included in the utility message transmission as a single dedicated sub-carrier, a single dedicated sub-band, a single bit, and/or overlaid information. The utility message can for example comprise a data packet or a control packet. A control packet can for example be an acknowledgement frame, a block acknowledgement, a block acknowledgement request, a request-to-send or a clear-to-send.

FIG. 13 is a flow chart illustrating a method of a station according to an embodiment. When the station is in the Doze state, the station occasionally enters 1300 the Awake state for determining whether data for the station is buffered in the access point device and then re-enter 1310 the Doze state if no data for the station seems to be buffered 1306 in the access point device. The station reads 1302 upon entering the Awake state, any of a beacon message regularly transmitted on the communication channel by the access point device or a second indication included in a utility message. The beacon message includes a first indication that data for one or more stations arranged to communicate via the access point device over the communication channel is buffered in the access point device when data is buffered in the access point. The first indication may for example comprise a Traffic Information Map. A utility message, which is transmitted over the communication channel between transmissions of the beacon messages, comprises the second indication for at least one of the one or more stations whether an upcoming beacon message comprises the first indication that data for power save mode stations is buffered in the access point device. The determining is made from the first found message comprising the first indication or the second indication that indicates whether no data for the station is buffered in the access point device or whether there may be data buffered in the access point device for the station. The first or second indication, whatever is read first, is extracted 1303. In order to make the determination to return 1310 to the Doze state faster for some situations, and thereby save further power, there is provided a short-cut in the processing for the case where the second indication is the first one extracted. Thus, it is determined 1305 whether the second indication is the same as previously read. This can be done by comparing a version indicator or identity or the extracted second indication with a stored version indicator or identity of the previously read second indication. If they are the same, there is simply no news, and the station returns 1310 to the Doze state. If they are not the same, the procedure proceeds to make the similar actions as demonstrated with reference to FIG. 12, i.e. upon indication 1306 that no data is buffered for the station, the station re-enters 1310 the Doze state and waits 1312 for next time to wake up 1300, and when it cannot be ascertained 1306 that no data is buffered, the station acts 1308 on the information according to any of the above demonstrated ways. The "short-cut" in the above demonstrated procedure provides for faster return to Doze state when possible, and thus a further power saving.

FIG. 14 is a flow chart illustrating certain actions of a method of a station according to an embodiment which comprises including 1402 the second indication in a utility message sent 1404 by the station. The actions demonstrated with reference to FIG. 14 may be employed in combination with any of the approaches demonstrated with reference to FIGS. 12, 13 and 15. The inclusion may comprise deriving 1400 the second indication from any of a read utility message containing the second indication and a read beacon message. When derived from a utility message, the second indication is simply copied. When derived from a beacon message, the second indication may be formed such that it reflects what is given by a first indication of an upcoming beacon assuming that the first indication of the upcoming beacon will be the same as in the recently read beacon. The second indication can for example be included in the utility message transmission as a single dedicated sub-carrier, a single dedicated sub-band, a single bit, and/or overlaid information. The utility message can for example comprise a data packet or a control packet. A control packet can for example be an acknowledgement frame, a block acknowledgement, a block acknowledgement request, a request-to-send or a clear-to-send. The utility message is transmitted 1404 accordingly with the included second indication.

Figure 15:
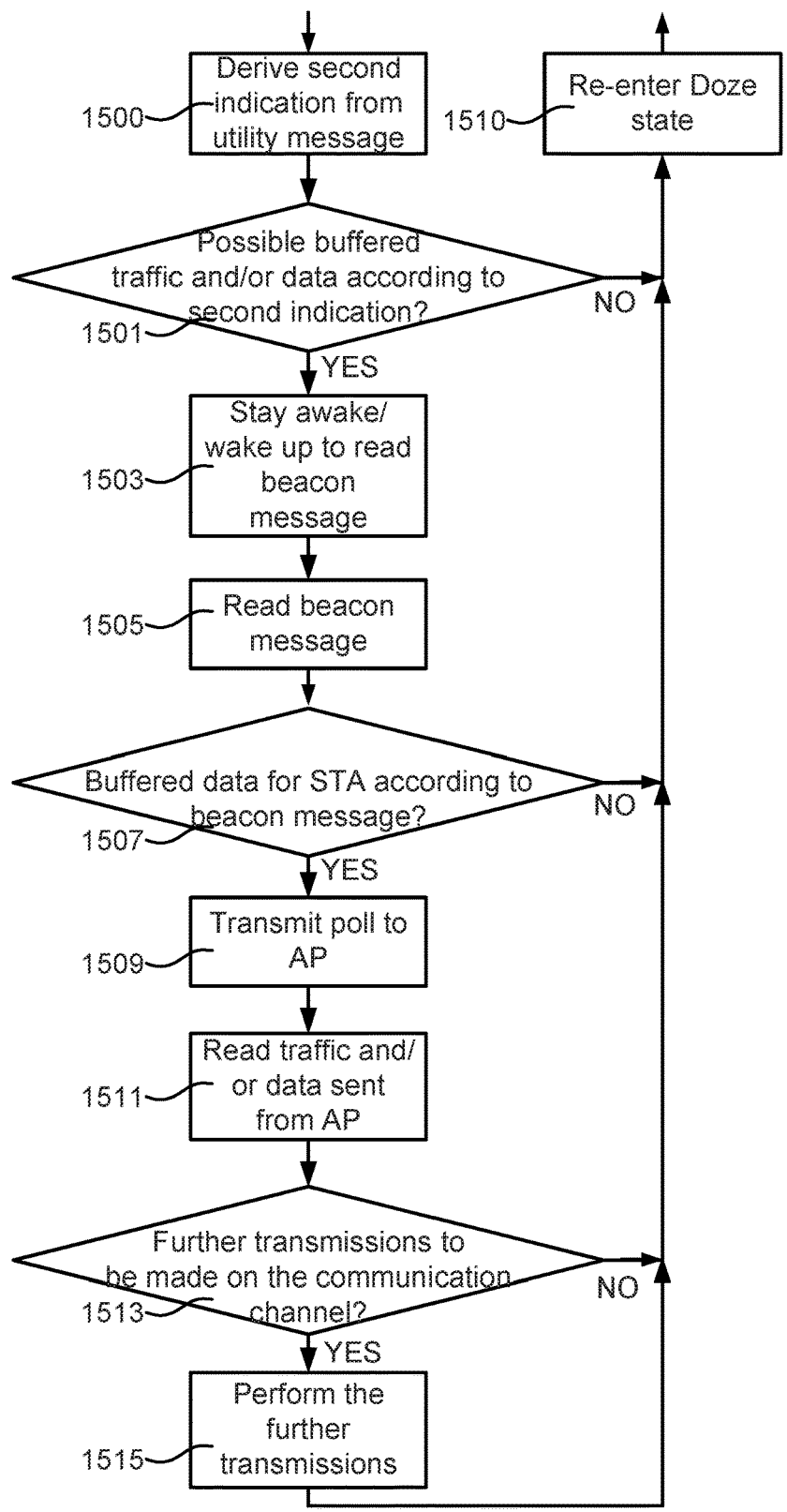
FIG. 15 is a flow chart illustrating certain actions of a method of a station according to an embodiment.

FIG. 15 is a flow chart illustrating certain actions of a method of a station according to an embodiment. In brief, FIG. 15 illustrates an example on how to act when buffered traffic and/or data may be present for the station, as has been only briefly indicated with reference to the embodiments demonstrated in FIGS. 12 and 13. Thus, the teachings put forward with reference to FIG. 15 may be applicable both the embodiments demonstrated with reference to FIGS. 12 and 13.

When a second indication has been derived 1500 from a utility message, it is checked 1501 whether there is a possibility for buffered traffic and/or data for the station waiting at the access point device. If not, the station re-enters 1510 the Doze state. If there is possible buffered traffic and/or data, i.e. the second indication indicates that the first indication of an upcoming beacon message comprises information about buffered traffic and/or data, or the second indication is negative on that no traffic and/or data is buffered, the station either stays awake 1503 until the upcoming beacon message can be received or is scheduled to start 1503 its receiver again for the upcoming beacon message. The beacon message is then read 1505. From the first indication of the beacon message it is determined 1507 whether there is buffered traffic and/or data for the station.

If not, the station re-enters 1510 the Doze state. If there is, the station polls 1509 the access point device for the buffered traffic and/or data such that the access point device can commence transmitting the buffered traffic and/or data to the station. The station thus receives and reads 1511 the traffic and/or data. The station may check 1513 whether any further transmissions should be made before closing the session. If not, the station returns 1510 to the Doze state. If there is, the station performs 1515 the further transmissions and then returns 1510 to the Doze state.

Figure 16:
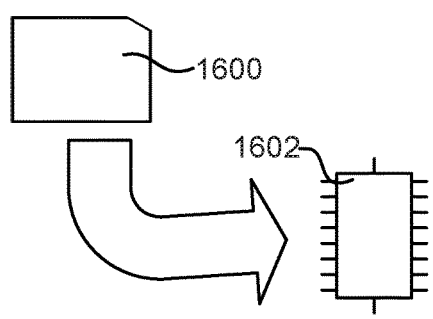
FIG. 16 schematically illustrates a computer-readable medium and a processing device of a station.

FIG. 16 schematically illustrates a computer-readable medium 1600, which may be non-transitory, and a processing device 1602 of a station. The methods as demonstrated with reference to FIGS. 12 to 15 are suitable for implementation with aid of processing means, such as computers and/or processors, especially for the case where the processing element 1106 demonstrated above comprises a processor handling operation for power saving mode of the station, i.e. acts as a controller 1106 for those operations. Therefore, there is provided computer programs, comprising instructions arranged to cause the processing means, processor, or computer to perform the steps of any of the methods according to any of the embodiments described with reference to FIGS. 12 to 15. The computer programs preferably comprises program code which is stored on the computer-readable medium 1600, as illustrated in FIG. 16, which can be loaded and executed by the processing means, processor, or computer 1602 to cause it to perform the methods, respectively, according to embodiments demonstrated above, preferably as any of the embodiments described with reference to FIGS. 12 to 15. The processing device 1602 and computer program product 1600 can be arranged to execute the program code sequentially where actions of the any of the methods are performed stepwise, but may as well perform actions on a real-time basis. The processing means, processor, or computer 1602 is preferably what normally is referred to as an embedded system. Thus, the depicted computer-readable medium 1600 and processing device 1602 in FIG. 16 should be construed to be for illustrative purposes only to provide understanding of the principle, and not to be construed as any direct illustration of the elements.

The invention claimed is:

1. An access point device comprising:
    a transceiver configured to receive and send messages on a communication channel; and
    a controller configured to cause the transceiver to transmit beacon messages regularly on the communication channel,
    wherein each of the beacon messages includes a respective first indication for each respective one of a plurality of stations arranged to communicate with the access point device over the communication channel, wherein each respective first indication indicates whether data for the respective one of the plurality of stations is buffered in a buffer associated with the access point device,
    wherein:
    the transceiver is arranged to transmit at least one utility message, transmitted over the communication channel between transmissions of the beacon messages, wherein the at least one utility message comprises a second indication whether data is buffered in the buffer for any one or more of the plurality of stations.

2. The access point device of claim 1, wherein the second indication comprises an identity such that a repeated second indication is enabled to be discriminated from an updated second indication.

3. The access point device of claim 1, wherein the second indication indicates that the upcoming beacon message comprises one or more first indications that data for the respective one or more stations is buffered in the buffer.

4. The access point device of claim 1, wherein the second indication indicates that no data for any stations of the plurality of stations is buffered in the buffer.

5. The access point device of claim 1, wherein the second indication is present in the utility message transmission as any one of:
   a single dedicated sub-carrier,
   a single dedicated sub-band,
   a single bit, and
   overlaid information.

6. The access point device of claim 1, wherein the utility message comprises any one of a data packet and a control packet.

7. The access point device of claim 6, wherein the control packet comprises any one of:
   an acknowledgement frame;
   a block acknowledgement;
   a block acknowledgement request;
   a request-to-send; and
   a clear-to-send.

8. The access point of claim 1, wherein the first indications are comprised in a Traffic Information Map.

9. A method of an access point device, the access point device comprising a transceiver configured to receive and send messages on a communication channel and a controller, the method comprising:
   transmitting beacon messages regularly on the communication channel, wherein each of the beacon messages includes a respective first indication for each respective one of a plurality of stations arranged to communicate with the access point device over the communication channel, wherein each respective first indication indicates whether data for the respective one of the plurality of stations is buffered in a buffer associated with the access point device,
   transmitting at least one utility message over the communication channel between transmissions of the beacon messages, wherein the at least one utility message comprises a second indication whether data is buffered in the buffer for any one or more of the plurality of stations.

10. The method of claim 9, wherein the second indication comprises an identity such that a repeated second indication is enabled to be discriminated from an updated second indication.

11. The method of claim 9, wherein the second indication indicates that the upcoming beacon message comprises one or more first indications that data for the respective one or more stations is buffered in the buffer.

12. The method of claim 9, wherein the second indication indicates that no data for any stations of the one or more stations is buffered in the buffer.

13. The method of claim 9, wherein the second indication is present in the utility message transmission as any one of:
   a single dedicated sub-carrier,
   a single dedicated sub-band,
   a single bit, and
   overlaid information.

14. The method of claim 9, wherein the utility message comprises any one of a data packet and a control packet.

15. The method of claim 14, wherein the control packet comprises any one of:
   an acknowledgement frame;
   a block acknowledgement;
   a block acknowledgement request;
   a request-to-send; and
   a clear-to-send.

16. The method of claim 9, wherein the first indications are comprised in a Traffic Information Map.

17. A station arranged to communicate over a communication channel with an access point device, and arranged to apply a power save mode including a Doze state and an Awake state, wherein, when the station is in the Doze state, the station occasionally enters the Awake state for determining whether data for the station is buffered in a buffer associated with the access point device and then re-enters the Doze state if no data for the station is indicated to be buffered in the buffer, wherein the station is arranged to make the determining:
   from a beacon message when the beacon message is received first after entering the Awake state, which beacon message is regularly transmitted on the communication channel by the access point device, the beacon message including a respective first indication for each respective one of a plurality of stations arranged to communicate via the access point device over the communication channel, wherein the station is one of the plurality of stations, and wherein each respective first indication indicates whether data for the respective one of the plurality of stations is buffered in the buffer, and
   from a at least one utility message when the utility message is received first after entering the Awake state, which utility message is transmitted over the communication channel between transmissions of the beacon messages and comprising a second indication whether data is buffered in the buffer for any one or more of the plurality of stations,
   and wherein the station is arranged to perform the re-entering to the Doze state at the first found one of the first indication and the second indication that indicates that no data for the station is buffered in the buffer.

18. The station of claim 17, wherein the second indication comprises an identity such that a repeated second indication is enabled to be discriminated from an updated second indication, wherein the station is arranged to re-enter the Doze state if it is determined that the second indication is a repeated second indication that the station already has read, and else read the second indication and determine whether to re-enter the Doze state based on the second indication.

19. The station of claim 17, wherein the second indication indicates that the upcoming beacon message comprises one or more first indications that data for the respective one or more stations is buffered in the buffer, wherein the station is arranged to, when the second indication indicates that the upcoming beacon message comprises the first indication, stay in the Awake state and read the upcoming beacon message.

20. The station of claim 17, wherein the second indication indicates whether no data for any stations is buffered in the buffer, wherein the station is arranged to stay in the Awake state and read the upcoming beacon message when the second indication fails to indicate that no data for any stations is buffered in the buffer, and to re-enter the Doze state when the second indication indicates that no data for any stations of the plurality of stations is buffered in the buffer.

21. The station of claim 17, wherein the station is arranged to, upon sending a subsequent utility message on the communication channel, include the second indication in the subsequent utility message.

22. The station of claim 21, wherein the second indication is included in the subsequent utility message transmission as any one of:
   a single dedicated sub-carrier,
   a single dedicated sub-band,
   a single bit, and
   overlaid information.

23. The station of claim 21, wherein the second indication to include in the subsequent utility message is derived from any of a read utility message containing the second indication and a read beacon message.

24. The station of claim 17, enabled to enter either the power save mode or a normal mode, wherein the power save mode is entered in negotiation with the access point such that the access point buffers traffic and/or data to the station and the station is enabled to acquire the buffered traffic and/or data by polling the access point, and the normal mode includes communicating with the access point whenever traffic occurs.

25. The station of claim 17, wherein the utility message including the second indication comprises any one of a data packet and a control packet.

26. The station of claim 25, wherein the control packets comprises any one of:
   an acknowledgement frame;
   a block acknowledgement;
   a block acknowledgement request;
   a request-to-send; and
   a clear-to-send.

27. The station of claim 17, wherein the first indications are comprised in a Traffic Information Map.

28. A method of a station arranged to communicate over a communication channel with an access point device, and arranged to operate in a power save mode comprising a Doze state and an Awake state, wherein, when the station is in the Doze state, the station occasionally enters the Awake state for determining whether data for the station is buffered in a buffer associated with the access point device and then re-enter the Doze state if no data for the station is indicated to be buffered in the buffer, wherein the method comprises:
   reading, upon entering the Awake state, a beacon message when the beacon message is received first after entering the Awake state, which beacon message is regularly transmitted on the communication channel by the access point device, the beacon message including a respective first indication for each respective one of a plurality of stations arranged to communicate via the access point device over the communication channel, wherein the station is one of the plurality of stations, and wherein each respective first indication indicates whether data for the respective one of the plurality of stations is buffered in the buffer, and a utility message when the utility message is received first after entering the Awake state, which utility message is transmitted over the communication channel between transmissions of the beacon messages, comprising a second indication whether data is buffered in the buffer for any one or more of the plurality of stations;
   determining, from the first found message of the beacon message and the utility message comprising the first indication or the second indication that indicates whether no data for the station is buffered in the buffer, whether there may be data buffered in the buffer for the station; and
   upon indication that no data is buffered for the station, re-entering the Doze state.

29. The method of claim 28, wherein the second indication comprises an identity such that a repeated second indication is enabled to be discriminated from an updated second indication, wherein the method comprises re-entering the Doze state if it is determined that the second indication is a repeated second indication that the station already has read, and else reading the second indication and determining whether to re-enter the Doze state based on the second indication.

30. The method of claim 28, wherein the second indication indicates that the upcoming beacon message comprises one or more first indications that data for the respective one or more stations is buffered in the buffer, wherein the method comprises staying in the Awake state and reading the upcoming beacon message when the second indication indicates that the upcoming beacon message comprises the first indication.

31. The method of claim 28, wherein the second indication indicates whether no data for any stations is buffered in the buffer, wherein the method comprises staying in the Awake state and reading the upcoming beacon message when the second indication fails to indicate that no data for any stations of the plurality of stations is buffered in the buffer, and re-entering the Doze state when the second indication indicates that no data for any stations is buffered in the buffer.

32. The method of claim 28, wherein the method comprises including the second indication in a subsequent utility message upon sending the subsequent utility message on the communication channel.

33. The method of claim 32, wherein the second indication is included in the subsequent utility message transmission as any one of:
   a single dedicated sub-carrier,
   a single dedicated sub-band,
   a single bit, and
   overlaid information.

34. The method of claim 32, comprising deriving the second indication to include in the subsequent utility message from any of a read utility message containing the second indication and a read beacon message.

35. The method of claim 28, wherein the station is enabled to enter either the power save mode or a normal mode, wherein the power save mode is entered in negotiation with the access point such that the access point buffers traffic and/or data to the station and the station is enables to acquire the buffered traffic and/or data by polling the access point, and the normal mode includes communicating with the access point whenever traffic occurs.

36. The method of claim 28, wherein the utility message including the second indication comprises any one of a data packet and a control packet.

37. The method of claim 36, wherein the control packet comprises any one of:
   an acknowledgement frame;
   a block acknowledgement;
   a block acknowledgement request;
   a request-to-send; and
   a clear-to-send.

38. The method of claim 28, wherein the first indications are comprised in a Traffic Information Map.

39. A non-transitory computer-readable storage medium comprising a computer program comprising instructions which, when executed on a processor of an access point device, causes the access point device to perform a method, wherein the access point comprises a transceiver configured to receive and send messages on a communication channel and a controller, and wherein the method comprises:

transmitting beacon messages regularly on the communication channel, wherein each of the beacon messages includes a respective first indication for each respective one of a plurality of stations arranged to communicate with the access point device over the communication channel, wherein each respective first indication indicates whether data for the respective one of the plurality of stations is buffered in a buffer associated with the access point device, transmitting at least one utility message over the communication channel between transmissions of the beacon messages, wherein the at least one utility message comprises a second indication whether data is buffered in the buffer for any one or more of the plurality of stations.

40. A non-transitory computer-readable storage medium comprising a computer program comprising instructions which, when executed on a processor of a station, causes the station to perform a method, wherein the station is arranged to communicate over a communication channel with an access point device, and arranged to operate in a power save mode comprising a Doze state and an Awake state, wherein, when the station is in the Doze state, the station occasionally enters the Awake state for determining whether data for the station is buffered in a buffer associated with the access point device and then re-enter the Doze state if no data for the station is indicated to be buffered in the buffer, and wherein the method comprises:

reading, upon entering the Awake state, a beacon message when the beacon message is received first after entering the Awake state, which beacon message is regularly transmitted on the communication channel by the access point device, the beacon message including a respective first indication for each respective one of a plurality of stations arranged to communicate via the access point device over the communication channel, wherein the station is one of the plurality of stations, and wherein each respective first indication indicates whether data for the respective one of the plurality of stations is buffered in the buffer, and a utility message when the utility message is received first after entering the Awake state, which utility message is transmitted over the communication channel between transmissions of the beacon messages, comprising a second indication whether data is buffered in the buffer for any one or more of the plurality of stations;

determining, from the first found message of the beacon message and the utility message comprising the first indication or the second indication that indicates whether no data for the station is buffered in the buffer, whether there may be data buffered in the buffer for the station; and upon indication that no data is buffered for the station, re-entering the Doze state.

* * * * *

UNITED STATES PATENT AND TRADEMARK OFFICE
CERTIFICATE OF CORRECTION

PATENT NO. : 10,306,556 B2
APPLICATION NO. : 15/312634
DATED : May 28, 2019
INVENTOR(S) : Butt et al.

Page 1 of 1

It is certified that error appears in the above-identified patent and that said Letters Patent is hereby corrected as shown below:

On the Title Page

Item (72), under "Inventors", in Column 1, Line 2, delete "Raa (SE);" and insert -- Råå (SE); --, therefor.

In the Specification

In Column 3, Line 29, delete "a at" and insert -- at --, therefor.

In Column 7, Line 66, delete "s," and insert -- s; --, therefor.

In Column 12, Line 9, delete "medium access (MAC)" and insert -- medium access control (MAC) --, therefor.

In the Claims

In Column 19, Line 25, in Claim 8, delete "point of" and insert -- point device of --, therefor.

In Column 20, Line 30, in Claim 17, delete "a at" and insert -- at --, therefor.

Signed and Sealed this
First Day of September, 2020

Andrei Iancu
*Director of the United States Patent and Trademark Office*